(12) United States Patent
Yagi

(10) Patent No.: US 9,479,663 B2
(45) Date of Patent: Oct. 25, 2016

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Yuichi Yagi, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/091,158

(22) Filed: Nov. 26, 2013

(65) Prior Publication Data

US 2014/0146336 A1 May 29, 2014

(30) Foreign Application Priority Data

Nov. 29, 2012 (JP) .................................. 2012-261312

(51) Int. Cl.
| | |
|---|---|
| *G06F 15/00* | (2006.01) |
| *H04N 1/00* | (2006.01) |
| *G06F 3/12* | (2006.01) |
| *H04W 52/02* | (2009.01) |

(52) U.S. Cl.
CPC ........ *H04N 1/00904* (2013.01); *G06F 3/1221* (2013.01); *G06F 3/1236* (2013.01); *G06F 3/1285* (2013.01); *H04N 1/00891* (2013.01); *H04W 52/0216* (2013.01); *Y02B 60/1271* (2013.01); *Y02B 60/50* (2013.01)

(58) Field of Classification Search
CPC .............................. H04N 1/0085; Y02B 60/50
USPC ........................................................ 358/1.13
See application file for complete search history.

(56) References Cited

U.S. PATENT DOCUMENTS

2012/0274973 A1* 11/2012 Nishikawa ......... G06K 15/4055
358/1.14

FOREIGN PATENT DOCUMENTS

| JP | 2002-178604 A | 6/2002 |
|---|---|---|
| JP | 2002-300175 A | 10/2002 |
| JP | 2009-071385 A | 4/2009 |
| JP | 2011-254205 A | 12/2011 |

* cited by examiner

*Primary Examiner* — Saeid Ebrahimi Dehkord
(74) *Attorney, Agent, or Firm* — Canon USA, Inc., IP Division

(57) ABSTRACT

When an information processing apparatus receives a large amount of data while a power saving mode is enabled, a communication delay easily occurs and user's convenience is reduced. Therefore, when the information processing apparatus displays a specific screen thereon, the power saving mode is disabled.

7 Claims, 15 Drawing Sheets

FIG. 8A

800 CLOUD PRINT SCREEN

CLOUD PRINT

SELECT DATA TO PRINT.    803

| FILE NAME | SAVE DATE AND TIME |
|---|---|
| Report-001.doc | 2012/10/09 | — 804
| Image1010.jpg | 2012/10/10 | — 805
| Image1013.jpg | 2012/10/13 | — 806
| PRESENTATION MATERIAL.ppt | 2012/10/14 | — 807

PRINT — 808

TOP    BACK
801    802

FIG. 8B

810 CLOUD PRINT SCREEN

CLOUD PRINT

SELECT DATA TO PRINT.

GETTING "Image1010.jpg"  — 811

PRINT

TOP    BACK

900 MAINTENANCE SCREEN

MAINTENANCE

SELECT MAINTENANCE ITEM.

| TONER REPLACEMENT | ~903 |
| JAM REMOVAL | ~904 |
| CALIBRATION | ~905 |

VIEW ANIMATION ~906

TOP — 901    BACK — 902

910 MAINTENANCE SCREEN

MAINTENANCE

TONER REPLACEMENT (STEP1) OPEN COVER A.

~911

912    PAUSE ~913

TOP    BACK

FIG. 11

1100 MANAGEMENT TABLE

| SCREEN | SWITCH TO DISABLED POWER SAVING MODE |
|---|---|
| MENU SCREEN | NOT NECESSARY |
| COPY SCREEN | NOT NECESSARY |
| CLOUD PRINT SCREEN | NECESSARY |
| MAINTENANCE SCREEN | NECESSARY |
| SETTING SCREEN | NOT NECESSARY |
| HISTORY SCREEN | NOT NECESSARY |

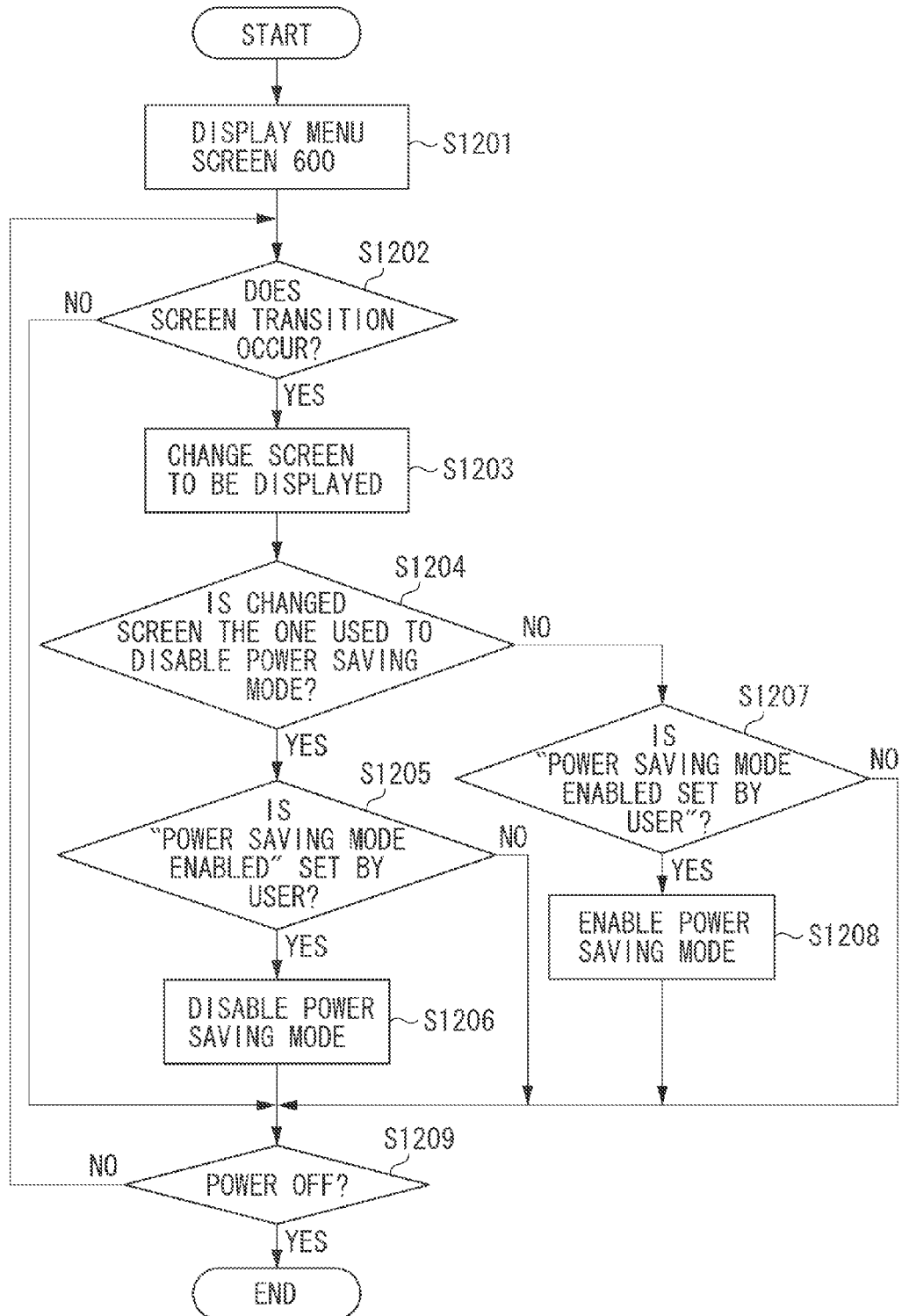

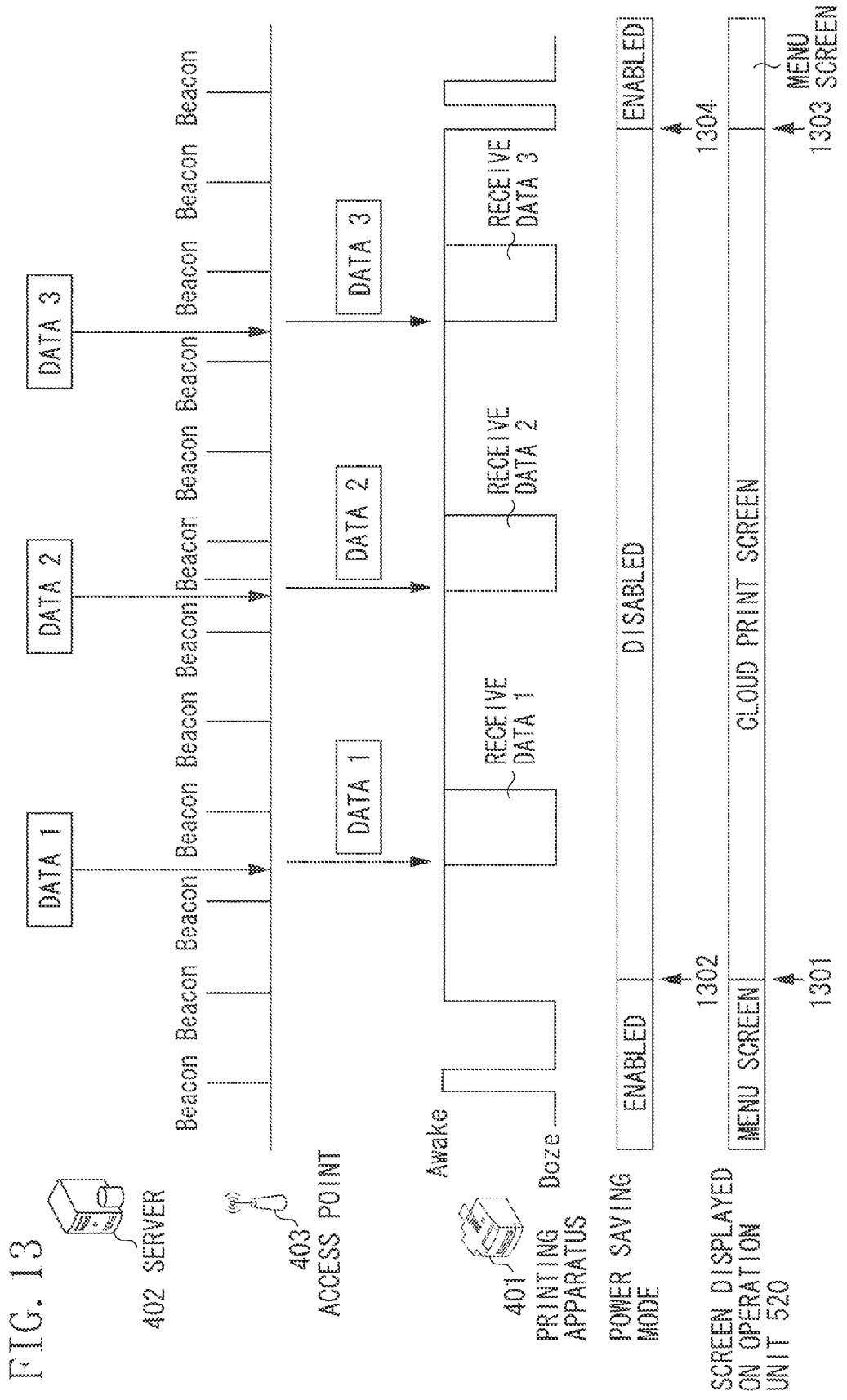

FIG. 14A

1400 SCREEN INFORMATION

```
<html>
<head>
<title>MENU</title>
<power save mode = ON>  ~1401
</head>
<body>
  .
  .
 (OMITTED)
  .
  .
</body>
</html>
```

FIG. 14B

1410 SCREEN INFORMATION

```
<html>
<head>
<title>CLOUD PRINT</title>
<power save mode = OFF>  ~1411
</head>
<body>
  .
  .
 (OMITTED)
  .
  .
</body>
</html>
```

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to an information processing apparatus, a method for controlling the information processing apparatus, and a storage medium.

2. Description of the Related Art

In recent years, many information processing apparatuses with a wireless local area network (LAN) conforming to the IEEE802.11 standard have been produced. As a technique for reducing power consumption of a wireless communication unit for making wireless communication, there is known a power saving mode of a wireless LAN discussed in Japanese Patent Application Laid-Open No. 2002-300175. The power saving mode will be described with reference to FIGS. 1, 2, and 3.

FIG. 1 illustrates processing performed when the power saving mode is disabled. FIG. 1 illustrates a printing apparatus as an example of an information processing apparatus with a wireless LAN. When the power saving mode is disabled in the printing apparatus, a wireless communication unit of the printing apparatus is always in an Awake state, or in a power-supplied state. When the wireless communication unit is in the Awake state, the printing apparatus can transmit data to an external device such as server or receive data transmitted from an external device by use of wireless communication.

When an access point receives data addressed to the printing apparatus from an external device (101), the access point transmits the data to the printing apparatus (102). The access point transmits a signal called beacon at constant intervals to a peripheral device, and the data transmission illustrated at 102 of FIG. 1 is performed irrespective of the beacon intervals.

Processing performed when the power saving mode is enabled will be described below with reference to FIG. 2. When the power saving mode is enabled, the wireless communication unit repeats a transition between the Awake state and a Doze state. The Doze state is a state in which power supplying to the wireless communication unit is blocked or reduced, and when the wireless communication unit is in the Doze state, the printing apparatus cannot transmit data to an external device or receive data transmitted from an external device by use of wireless communication.

When the power saving mode is enabled, the wireless communication unit intermittently transitions from the Doze state to the Awake state in synchronization with the beacon intervals of the access point (201 to 203). The access point which receives data (data addressed to the printing apparatus) transmitted from the external device uses information such as Traffic Indication Message (TIM) or Delivery Traffic Indication Message (DTIM) to notify, to the printing apparatus, that the data addressed to the printing apparatus is present (204, 205). TIM is directed for notifying, to the printing apparatus, that data addressed to the printing apparatus is present. DTIM is a type of TIM, and indicates that data to be transmitted is for multicast or broadcast.

The printing apparatus which transitions to the Awake state at timing 206 in FIG. 2 receives TIM notified at timing 205. The printing apparatus requests the access point to transmit the data (207). The access point which receives the request at timing 207 transmits data 1 to the printing apparatus (208).

When the power saving mode is enabled, the wireless communication unit transitions from the Awake state to the Doze state under a condition that data is not transmitted nor received between the printing apparatus and the access point in the Awake state for a predetermined time (half the beacon interval, for example). In FIG. 2, when a predetermined time 209 elapses after the printing apparatus receives the data 1, the wireless communication unit transitions from the Awake state to the Doze state (210). After transitioning to the Doze sate, the wireless communication unit intermittently transitions from the Doze state to the Awake state in synchronization with the beacon intervals of the access point similarly as at 201 to 203. The condition that the wireless communication unit transitions from the Awake state to the Doze state is not limited to an elapse of the predetermined time 209. The wireless communication unit may transition from the Awake state to the Doze state under a condition that no accumulation of data addressed to the printing apparatus is confirmed by the beacon.

The power saving mode of the wireless LAN is enabled thereby to reduce power consumption of the wireless communication unit. However, when the power saving mode of the wireless LAN is enabled, a communication delay easily occurs when the printing apparatus receives data (such as print data) transmitted from the access point. The reason why a delay easily occurs will be described with reference to FIG. 3.

When the external device transmits a large amount of data (large-size data) to the printing apparatus via the access point, the large amount of data is divided to be transmitted. FIG. 3 illustrates an example in which a large amount of data is divided into data 1, data 2, and data 3 to be transmitted. The access point receives the data 1 transmitted from the external device at 301. When the power saving mode is disabled, the access point can immediately start to transmit the data 1 to the printing apparatus, but the power saving mode is enabled, and thus the access point waits until a next beacon timing and then transmits the data 1 to the printing apparatus. That is, a communication delay with time 302 occurs unlike when the power saving mode is disabled.

The wireless communication unit of the printing apparatus which has completely received the data 1 transitions from the Awake state to the Doze state at timing 303 if data is not transmitted nor received for a predetermined time. If a timing when the access point receives the data 2 from the information processing apparatus is later than 303 as illustrated in FIG. 3, the access point waits until a next beacon timing and then transmits the data 2 to the printing apparatus. That is, a communication delay with time 304 occurs also when the access point transmits the data 2 to the printing apparatus. A communication delay with time 305 similarly occurs also when the access point transmits the data 3 to the printing apparatus.

FIG. 3 illustrates the example in which a large amount of data is divided into three items of data, but the number of items of divided data to be actually transmitted is enormous, and thus a communication delay is more conspicuous. As a technique for solving the issue, Japanese Patent Application Laid-Open No. 2009-071385 discusses therein a communication terminal device for disabling a power saving mode of a wireless LAN on receiving streaming data such as moving images or sounds. The communication terminal device discussed in Japanese Patent Application Laid-Open No. 2009-071385 disables the power saving mode of the wireless LAN on receiving streaming data such as moving images or sounds, thereby preventing a communication delay with 304 or 305 of FIG. 3 from occurring.

The communication terminal device discussed in Japanese Patent Application Laid-Open No. 2009-071385 can prevent a communication delay from occurring on receiving streaming data such as moving images or sounds in the power saving mode of the wireless LAN. However, the communication terminal device discussed in Japanese Patent Application Laid-Open No. 2009-071385 disables the power saving mode on receiving streaming data, and thus cannot prevent a communication delay illustrated at 302 of FIG. 3 from occurring. The communication terminal device discussed in Japanese Patent Application Laid-Open No. 2009-071385 cannot disable the power saving mode if the received data is not streaming data such as moving images or sounds, even if a communication delay easily occurs in the data received in the communication terminal device.

SUMMARY OF THE INVENTION

The present invention features, among other things, preventing a communication delay which easily occurs when a power saving mode is enabled.

According to an aspect of the present invention, an information processing apparatus, for use with a wireless communication unit capable of making wireless communication with an external device, includes a display unit configured to display a screen, and a determination unit configured to, when the display unit displays the screen, determine whether to enable or disable a power saving mode of the wireless communication unit based on a type of the screen.

Further features of the present invention will become apparent from the following description of exemplary embodiments with reference to the attached drawings.

BRIEF DESCRIPTION OF THE DRAWINGS

FIGS. 8A, 8B, 8C, and 8D are diagrams illustrating a cloud print screen.

FIG. 11 is a diagram illustrating a management table.

FIG. 12 is a flowchart illustrating processing performed when the printing apparatus displays a screen thereon.

FIG. 13 is a diagram illustrating switching of a power saving mode between enabled and disabled.

FIGS. 14A and 14B are diagrams illustrating screen information.

DESCRIPTION OF THE EMBODIMENTS

Various exemplary embodiments, features, and aspects of the invention will be described in detail below with reference to the drawings.

The following exemplary embodiments do not intend to limit the present invention within the scope of claims, and all the combinations of characteristics described in the exemplary embodiments are not necessarily essential for solving the issues of the present invention.

Figure 4:
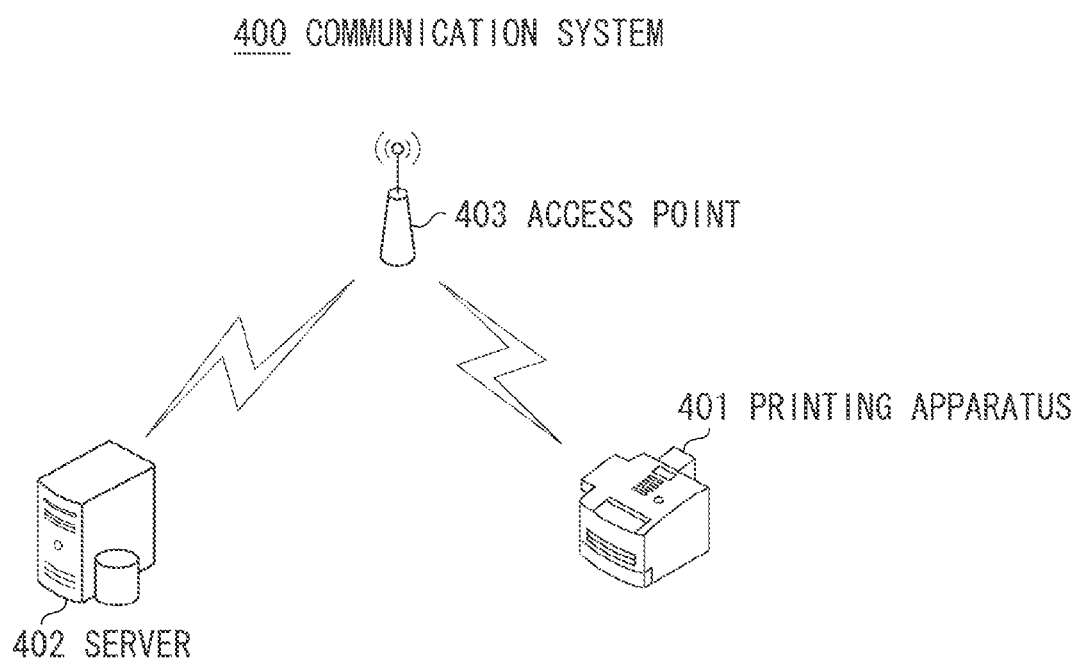
FIG. 4 is a diagram illustrating a communication system.

A structure of a communication system 400 according to a first exemplary embodiment will be described with reference to FIG. 4. The communication system 400 includes a printing apparatus 401, a server 402, and an access point 403. The printing apparatus 401 and the server 402 can make wireless communication via the access point 403. The server 402 can transmit print data or a maintenance moving image to the printing apparatus 401 via the access point 403.

Figure 5:
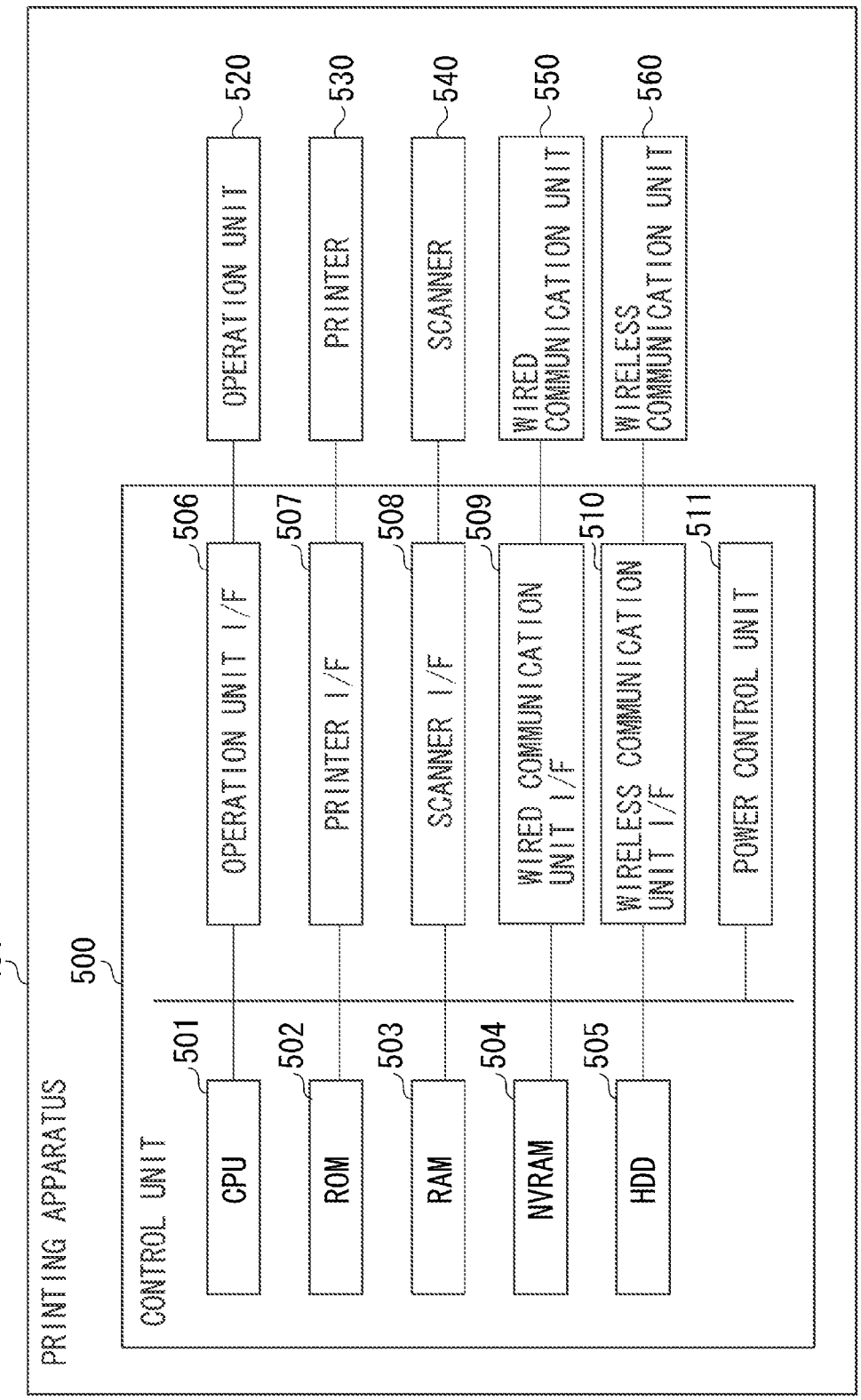
FIG. 5 is a diagram illustrating a hardware structure of a printing apparatus.

A hardware structure of the printing apparatus 401 will be described below with reference to FIG. 5. The printing apparatus 401 is a multifunction peripheral having a copy function, a print function, a scan function, and a transmission function. The present exemplary embodiment will be described using a multifunction peripheral as an example, but the printing apparatus 401 is not limited to a multifunction peripheral. The printing apparatus 401 does not need to have all the above functions, and may be a printer having only the printer function. Alternatively, the printing apparatus 401 may have other functions. The printing apparatus 401 is an exemplary information processing apparatus including a wireless communication unit, and the information processing apparatus including a wireless communication unit may be a personal computer (PC), not limited to a printing apparatus.

The printing apparatus 401 includes a control unit 500, an operation unit 520, a printer 530, a scanner 540, a wired communication unit 550, and a wireless communication unit 560. A central processing unit (CPU) 501 of the control unit 500 reads a control program stored in a read only memory (ROM) 502 to control the entire operations of the printing apparatus 401. A random access memory (RAM) 503 is used as a temporary storage area such as main memory or work area for the CPU 501. A nonvolatile random access memory (NVRAM) 504 is a nonvolatile memory and stores various items of information therein. A hard disk drive (HDD) 505 is used as a storage area for storing font data, emulation program and form data therein.

One CPU 501 in the printing apparatus 401 uses one memory (the RAM 503 or the HDD 505) to perform each processing illustrated in a flowchart described below, but may employ other form. For example, a plurality of CPUs or a plurality of RAMs or HDDs may cooperate thereby to perform each processing illustrated in the flowchart described below.

An operation unit interface (I/F) 506 connects the operation unit 520 and the control unit 500. The control unit 500 and the operation unit 520 exchange data via the operation unit I/F 506. The operation unit 520 is provided with a liquid crystal display unit having a touch panel function, a keyboard, or the like. A user can input an instruction into the printing apparatus 401 via the operation unit 520.

A printer I/F 507 connects the printer 530 and the control unit 500. The control unit 500 and the printer 530 exchange data via the printer I/F 507. The printer 530 performs print processing based on print data received from the server 402 or an external PC, or image data generated by the scanner 540.

A scanner I/F 508 connects the scanner 540 and the control unit 500. The control unit 500 and the scanner 540 exchange data via the scanner I/F 508. The scanner 540 reads an original thereby to generate image data.

A wired communication unit I/F 509 connects the wired communication unit 550 and the control unit 500. The control unit 500 and the wired communication unit 550 exchange data via the wired communication unit I/F 509. The wired communication unit 550 is connected with a LAN cable (not illustrated) thereby to communicate with an external device on a network.

A wireless communication unit I/F 510 connects the wireless communication unit 560 and the control unit 500. The control unit 500 and the wireless communication unit 560 exchange data via the wireless communication unit I/F 510. The wireless communication unit 560 can make wireless communication with an external device on a network via the access point 403.

A power control unit 511 controls power supplying from a power supply (not illustrated) to the respective units (the control unit 500, the operation unit 520, the printer 530, the scanner 540, the wired communication unit 550, and the wireless communication unit 560) of the printing apparatus 401.

The wireless communication unit 560 of the printing apparatus 401 according to the present exemplary embodiment has a power saving mode. When the power saving mode is disabled, the wireless communication unit 560 is always in an Awake state or a state in which power is being supplied from the power control unit 511. When the wireless communication unit 560 is in the Awake state, the printing apparatus 401 can transmit data to an external device or receive data transmitted from an external device by use of wireless communication.

On the other hand, when the power saving mode is enabled, the wireless communication unit 560 repeats a transition between the Awake state and a Doze state. The Doze state is a state in which power supplying from the power control unit 511 to the wireless communication unit 560 is blocked or reduced. When the wireless communication unit 560 is in the Doze state, the printing apparatus 401 cannot transmit data to an external device or receive data transmitted from an external device by use of wireless communication.

When the power saving mode is enabled, the wireless communication unit 560 of the printing apparatus 401 transitions from the Doze state to the Awake state in synchronization with the beacon intervals of the access point 403. Power consumption of the wireless communication unit 560 of the printing apparatus 401 can be further reduced when the power saving mode is enabled than when the power saving mode is disabled.

The screens to be displayed on the operation unit 520 of the printing apparatus 401 will be described below with reference to FIGS. 6 to 10. Each screen in FIGS. 6 to 10 is displayed based on image data previously stored in the HDD 505 of the printing apparatus 401. According to the present exemplary embodiment, the operation unit 520 is configured of a touch panel, and the user can select a desired button or item through a touch operation.

Figure 6:
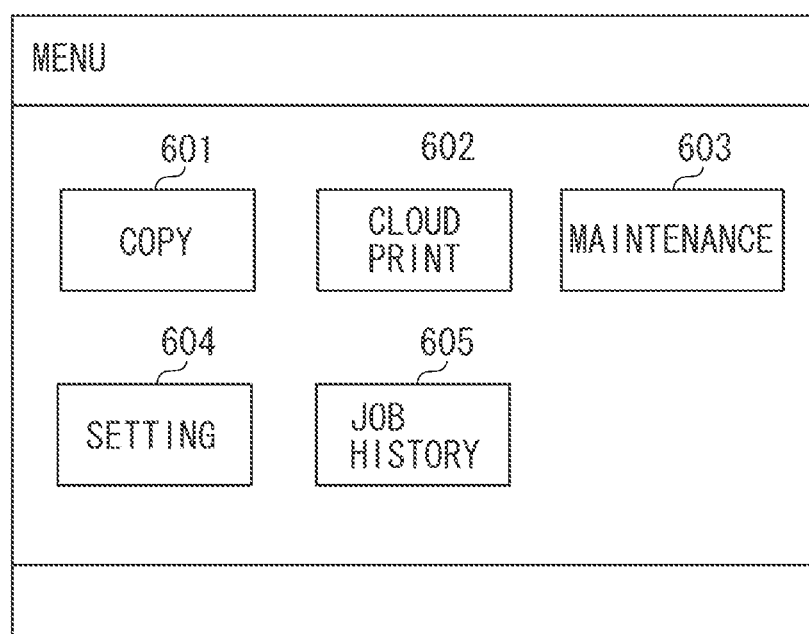
FIG. 6 is a diagram illustrating a menu screen.
Figure 7:
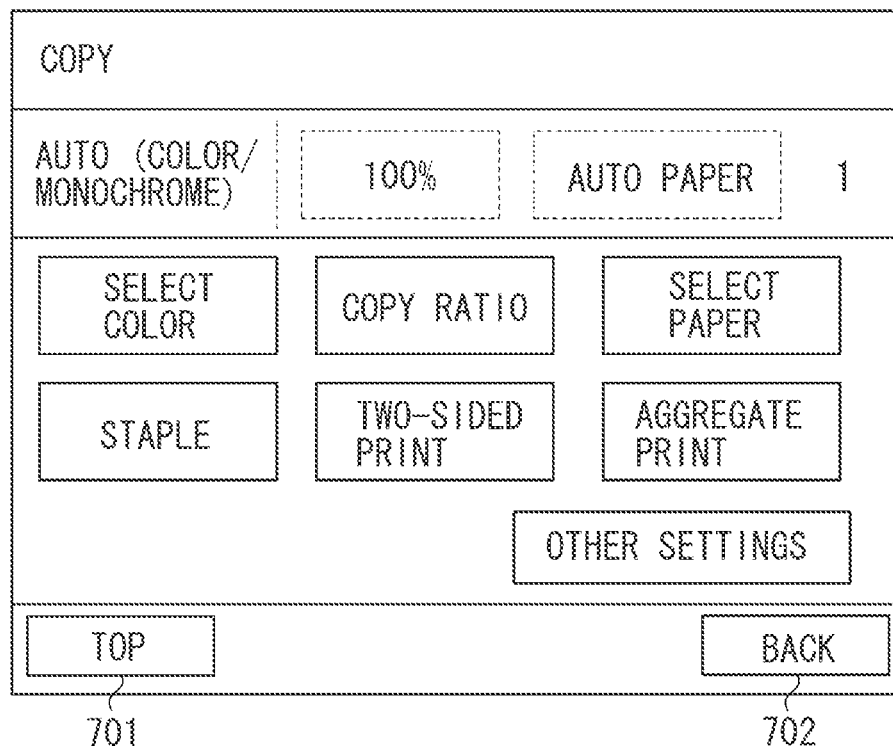
FIG. 7 is a diagram illustrating a copy screen.

FIG. 6 illustrates a menu screen 600. The menu screen 600 displays buttons 601 to 605 thereon, and the user selects a desired button thereby to use a function provided by the printing apparatus 401.

When the user wants to use a copy function, the user selects the button 601 on the menu screen 600. When the user selects the button 601, the operation unit 520 displays a copy screen 700 illustrated in FIG. 7 thereon. The user can perform copy setting such as color print setting, staple setting, or two-sided print setting on the copy screen 700. When the user performs copy setting and presses an OK button (not illustrated), the printing apparatus 401 performs copying based on the copy setting. When the user selects a button 701, the operation unit 520 displays the menu screen 600 thereon, and when the user selects a button 702, the operation unit 520 displays a screen one screen before the currently-displayed screen thereon.

When the user wants to use a cloud print function, the user selects the button 602 on the menu screen 600. The cloud print function of the printing apparatus 401 is directed for acquiring print data previously stored in the server 402 and performing printing based on the acquired print data.

When the user selects the button 602 on the menu screen 600, a cloud print screen 800 illustrated in FIG. 8A is displayed. A list 803 displays print data previously stored in the server 402 therein. Four items of print data including print data 804, 805, 806, and 807 are stored in the server 402 on the cloud print screen 800. When the user selects desired print data in the list 803 and selects a print button 808, the printing apparatus 401 acquires the user-selected print data from the server 402 via the access point 403, and performs printing based on the acquired print data.

Figure 8C:
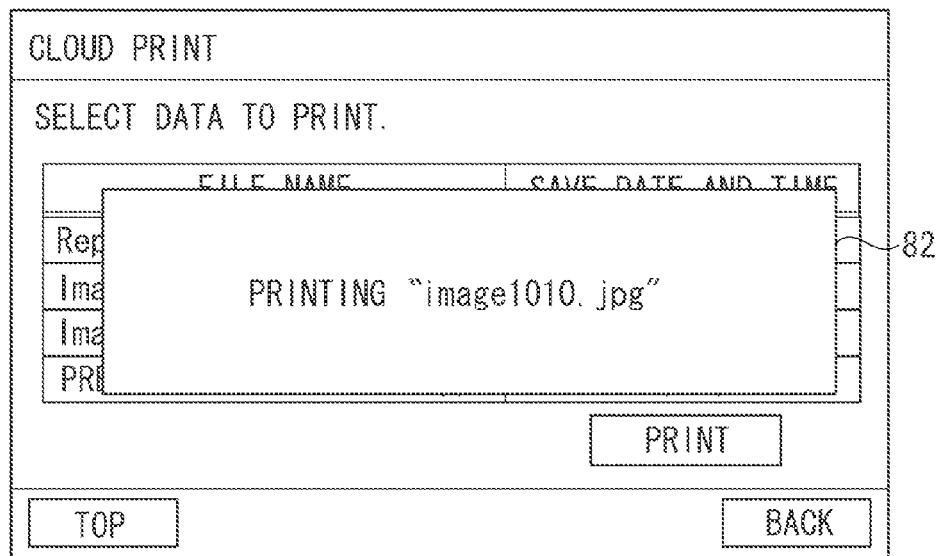
Figure 8D:
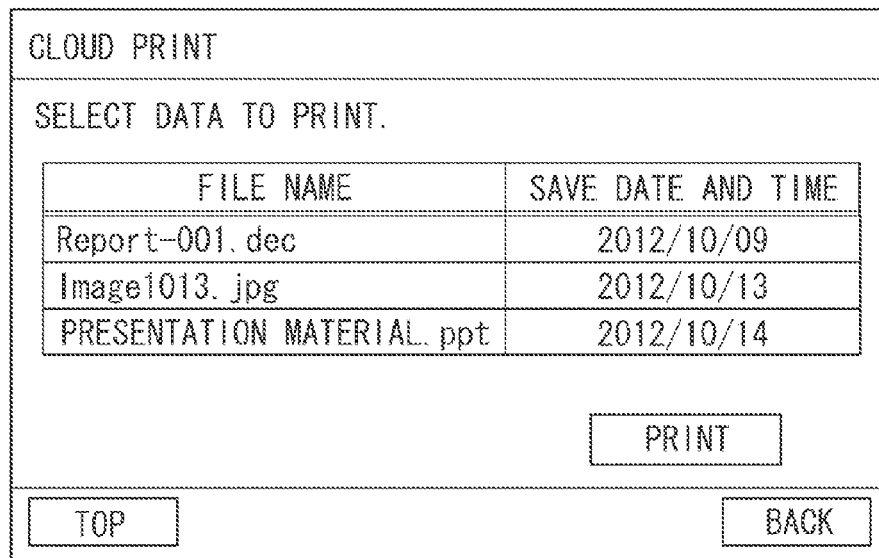

When the user selects desired print data such as the print data 805 and selects the print button 808, the printing apparatus 401 starts to acquire the print data 805, and the operation unit 520 displays a cloud print screen 810 illustrated in FIG. 8B thereon. A screen 811 indicates getting print data 805. When the printing apparatus 401 completely acquires the print data, the printing apparatus 401 starts to print the print data 805, and the operation unit 520 displays a cloud print screen 820 illustrated in FIG. 8C thereon. A screen 821 indicates printing the print data 805. When the printing apparatus 401 completely prints the print data 805, the operation unit 520 displays a cloud print screen 830 illustrated in FIG. 8D thereon.

When the user selects a button 801 on the cloud print screen 800, the operation unit 520 displays the menu screen 600 thereon, and when the user selects a button 802, the operation unit 520 displays a screen one screen before the currently-displayed screen.

Figures 9A, 9B:
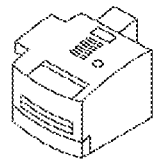
FIGS. 9A and 9B are diagrams illustrating a maintenance screen.

When the user selects the button 603 on the menu screen 600, the operation unit 520 displays a maintenance screen 900 illustrated in FIG. 9A thereon. The maintenance screen 900 displays therein three items (items 903 to 905) including toner replacement, jam (paper jam) removal, and calibration.

When the user selects any of the items 903 to 905 and selects a view button 906, the operation unit 520 displays thereon a maintenance moving image corresponding to the selected maintenance item. A maintenance screen 910 illustrated in FIG. 9B is displayed when the user selects the item 903 of "toner replacement" on the maintenance screen 900. A screen 911 displays therein the maintenance moving image for describing a toner replacement procedure. The maintenance moving image displayed in the screen 911 is displayed based on moving image data acquired by the printing apparatus 401 from the server 402. The user uses a seek bar 912 thereby to adjust a reproduction position of the maintenance moving image. When the user selects a pause button 913, the user can pause the maintenance moving image displayed in the screen 911 at a desired reproduction position.

When the user selects a button 901 on the maintenance screen 900, the operation unit 520 displays the menu screen 600 thereon, and when the user selects a button 902, the operation unit 520 displays a screen displayed one screen before the currently-displayed screen thereon.

Figure 10A:
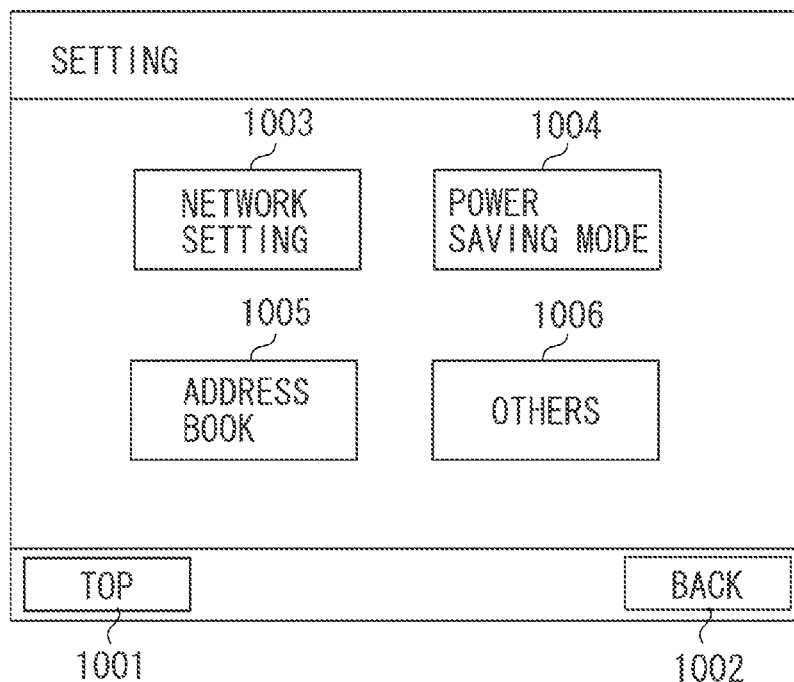
FIGS. 10A and 10B are diagrams illustrating a setting screen.

When the user selects the button 604 on the menu screen 600, the operation unit 520 displays a setting screen 1000 illustrated in FIG. 10A thereon. The user can perform various settings on the printing apparatus 401 on the setting screen 1000. When the user selects a button 1003 on the setting screen 1000, the operation unit 520 displays a network setting screen (not illustrated) thereon. The user can set an IPv4 address and an IPv6 address of the printing apparatus 401 on the network setting screen. Similarly, when the user selects a button 1005, the operation unit 520 displays an address book setting screen thereon, and when the user selects a button 1006, the operation unit 520 displays another network setting screen thereon.

Figure 10B:
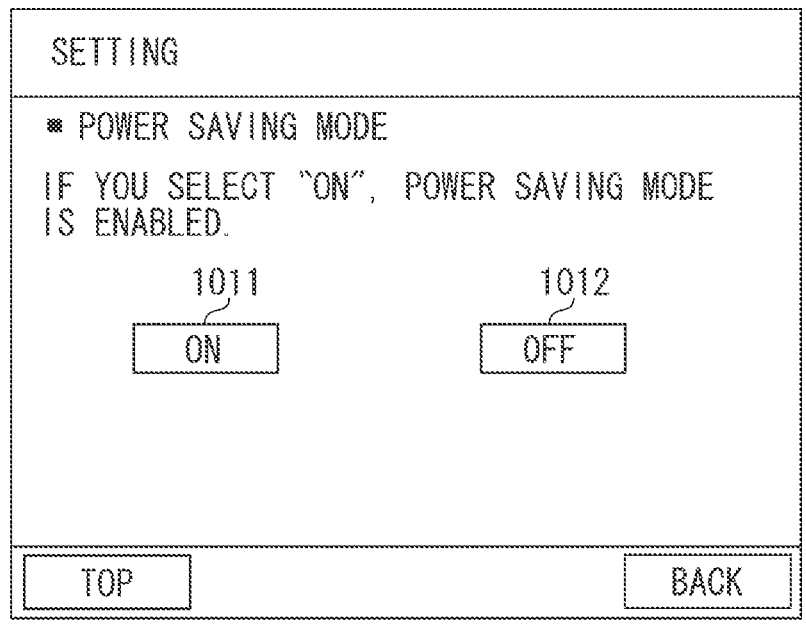

When the user selects a button 1004 on the setting screen 1000, the operation unit 520 displays a setting screen 1010 illustrated in FIG. 10B thereon. The setting screen 1010 is used by the user to designate to enable or disable the power saving mode of the wireless LAN. When the user selects an ON button 1011 on the setting screen 1010, the power saving mode is enabled in the printing apparatus 401. On the other hand, when the user selects an OFF button 1012 on the setting screen 1010, the power saving mode is disabled in the printing apparatus 401.

When the user selects a button 1001 on the setting screen 1000, the operation unit 520 displays the menu screen 600 thereon, and when the user selects a button 1002, the operation unit 520 displays a screen one screen before the currently-displayed screen thereon.

When the user selects the button 605 on the menu screen, the operation unit 520 displays a history screen (not illustrated) thereon. Histories of various jobs (such as print job) performed in the printing apparatus 401 are displayed on the history screen.

The screens to be displayed on the operation unit 520 of the printing apparatus 401 have been described above with reference to FIG. 6 to FIGS. 10A and 10B. The present exemplary embodiment is characterized in that when the operation unit 520 displays thereon a specific screen in which data for which a communication delay easily occurs is expected to be received, the power saving mode is disabled. For example, when the operation unit 520 displays the cloud print screen 800 illustrated in FIG. 8A thereon, the printing apparatus 401 is expected to receive a large amount of print data from the server 402, and thus the printing apparatus 401 disables the power saving mode of the wireless LAN. When the operation unit 520 displays the maintenance screen illustrated in FIG. 9A or 9B thereon, the printing apparatus 401 is expected to receive a large amount of moving image data from the server 402, and thus the printing apparatus 401 disables the power saving mode of the wireless LAN.

A management table 1100 illustrated in FIG. 11 indicates whether the power saving mode needs to be disabled for each screen displayed on the operation unit 520. The management table 1100 is stored in the HDD 505 of the printing apparatus 401. According to the present exemplary embodiment, the management table 1100 is assumed to be previously stored in the HDD 505 from the shipment of the product.

According to the present exemplary embodiment, the cloud print screen described in FIGS. 8A to 8D and the maintenance screen described in FIGS. 9A and 9B need to be switched to the power saving mode disabled for management. With the screens, the printing apparatus 401 is expected to receive a large amount of data from the server 402, and the power saving mode is desirably disabled to prevent a communication delay which easily occurs when the power saving mode is enabled. A cloud print screen for the management table 1100 is not limited to the cloud print screen 800 in FIG. 8A, and is assumed to include the cloud print screens 810, 820, and 830. A maintenance screen for the management table 1100 is not limited to the maintenance screen 900, and is assumed to include the maintenance screen 910 or a maintenance moving image (maintenance moving image for jam removal or calibration) of other than toner replacement.

On the other hand, the menu screen, the copy screen, the setting screen, and the history screen do not need to be switched to the power saving mode disabled for management. With the screens, the printing apparatus 401 does not receive a large amount of data from the server 402, and does not need to be switched to the power saving mode disabled for management. A copy screen for the management table 1100 is not limited to the copy screen 700 in FIG. 7, and is assumed to include a setting screen (not illustrated) for selecting a color or selecting paper for the copy function. Similarly, a setting screen for the management table 1100 is not limited to the setting screen in FIG. 10A, and is assumed to include the setting screen 1010 or a setting screen of other than the power saving mode.

The management table 1100 manages the cloud print screen and the maintenance screen as the screens with which the printing apparatus may receive data transmitted from an external device, or the screens for which the power saving mode is to be disabled. The management table 1100 manages the menu screen, the copy screen, the setting screen, and the history screen as the screens for which the power saving mode is enabled or disabled in response to a user's designation on the setting screen 1010.

The processing performed by the printing apparatus 401 when the operation unit 520 displays a screen thereon will be described below with reference to the flowchart of FIG. 12. The CPU 501 of the printing apparatus 401 develops and executes a program stored in a memory such as the ROM 502 into the RAM 503 thereby to perform each step illustrated in the flowchart of FIG. 12. It is assumed that the printing apparatus 401 is previously set by the user as to whether to enable or disable the power saving mode on the setting screen 1010 in FIG. 10B. The NVRAM 504 of the printing apparatus 401 stores the setting therein.

When the power supply of the printing apparatus 401 is turned ON, at first, in step S1201, the operation unit 520 displays the menu screen 600 of FIG. 6 thereon. Then, in step S1202, the CPU 501 determines whether a screen displayed on the operation unit 520 transitions. For example, when the user selects any of the buttons 601 to 605 on the menu screen 600, in step S1202, the CPU 501 determines that a screen transitions. The CPU 501 determines that a screen transitions (YES in step S1202), and then the processing proceeds to step S1203. On the other hand, the CPU 501 does not determine that a screen transitions (NO in step S1202), and then the processing proceeds to step S1209.

In step S1203, the operation unit 520 changes a screen to be displayed based on a user's selection. In step S1204, the CPU 501 determines whether a changed screen is to be used to disable the power saving mode. According to the present exemplary embodiment, the CPU 501 determines whether a changed screen is to be used to disable the power saving mode based on a type of the changed screen and the management table 1100 in FIG. 11. When the changed screen is managed as "necessary" in the management table 1100, or is the cloud print screen or the maintenance screen, the CPU 501 determines that the changed screen is to be used to disable the power saving mode (YES in step S1204), and then the processing proceeds to step S1205. On the other hand, when the changed screen is managed as "not necessary" in the management table 1100, the CPU 501 determines that the changed screen is not to be used to disable the power saving mode (NO in step S1204), and the processing proceeds to step S1207.

Step S1205 will be described below. In step S1205, the CPU 501 determines whether the "power saving mode enabled" is set by the user. If the user enables the power saving mode on the setting screen 1010 in FIG. 10B, in step S1205, the CPU 501 determines that the "power saving mode enabled" is set by the user (YES in step S1205), and the processing proceeds to step S1206. In step S1206, the CPU 501 disables the power saving mode, and the processing proceeds to step S1209. When the CPU 501 disables the power saving mode in step S1206, the wireless communication unit 560 notifies, to the access point 403, that the power saving mode is disabled. On the other hand, if the user disables the power saving mode on the setting screen 1010 in FIG. 10B, in step S1205, the CPU 501 determines that the "power saving mode enabled" is not set by the user (NO in step S1205), and the processing proceeds to step S1209.

Step S1207 will be described below. In step S1207, the CPU 501 determines whether the "power saving mode enabled" is set by the user. If the user enables the power saving mode on the setting screen 1010 in FIG. 10B, in step S1207, the CPU 501 determines that the "power saving mode enabled" is set by the user (YES in step S1207), and the processing proceeds to step S1208. In step S1208, the CPU 501 enables the power saving mode, and the processing proceeds to step S1209. When the user enables the power saving mode in step S1208, the wireless communication unit 560 notifies, to the access point 403, that the power saving mode is enabled. On the other hand, if the user disables the power saving mode on the setting screen 1010 in FIG. 10B, in step S1207, the CPU 501 determines that the "power saving mode enabled" is not set by the user (NO in step S1207), and the processing proceeds to step S1209.

Step S1209 will be described below. In step S1209, the CPU 501 determines whether the printing apparatus 401 is turned OFF by a power supply button (not illustrated). When the CPU 501 determines that the printing apparatus 401 is turned OFF in step S1209 (YES in step S1209), the printing apparatus 401 is powered off and the processing ends as illustrated in the flowchart. On the other hand, the CPU 501 determines that the printing apparatus 401 is not turned OFF in step S1209 (NO in step S1209), and then the processing returns to step S1202.

As described above, according to the present exemplary embodiment, when a screen to be displayed is a specific screen for which the power saving mode is to be disabled, or a screen with which the printing apparatus is expected to receive a large amount of data from an external device, the power saving mode can be temporarily disabled. This will be described in detail with reference to FIG. 13.

Figure 1:
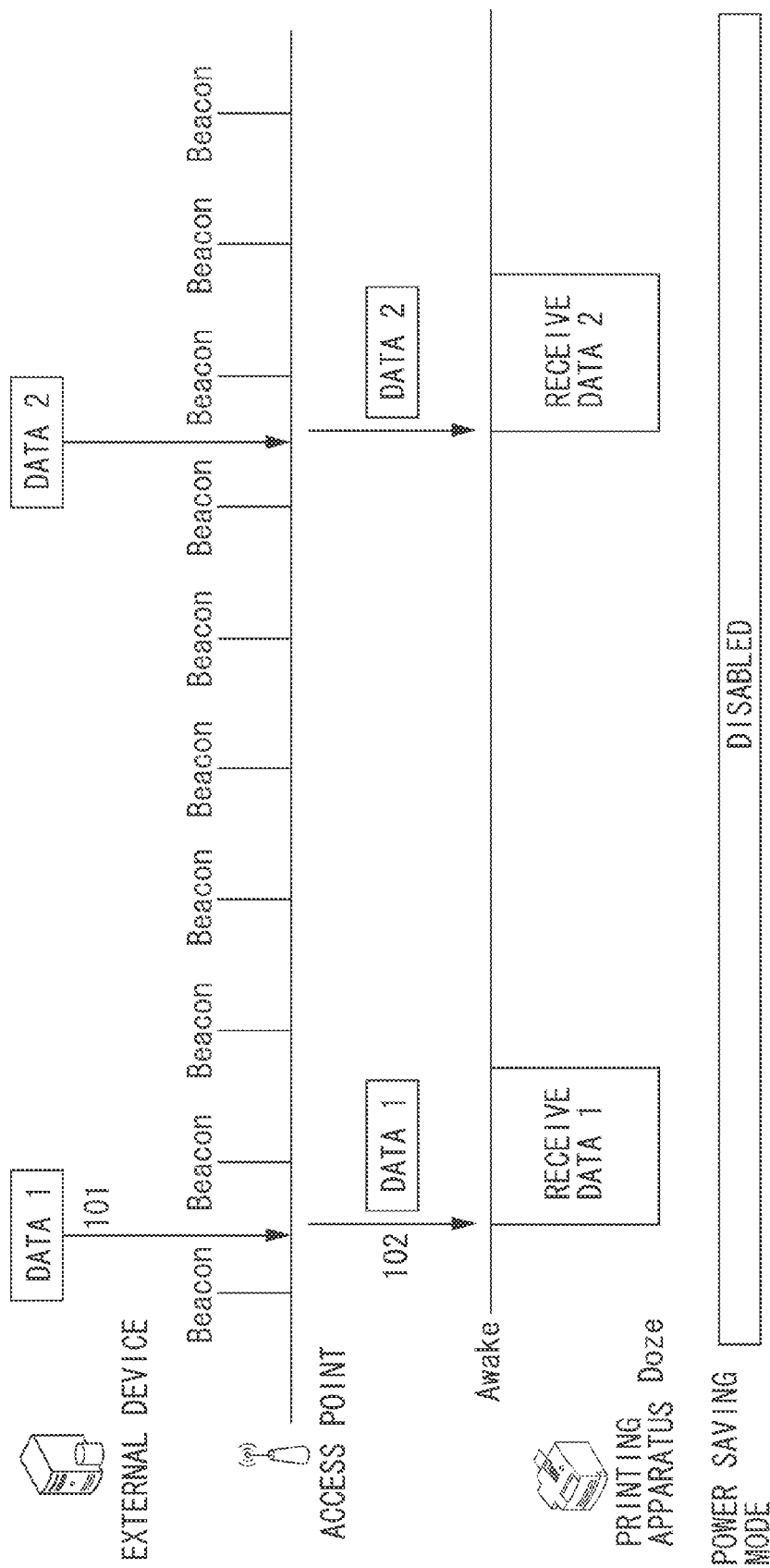
FIG. 1 is a diagram illustrating processing performed when a power saving mode is disabled in the related art.
Figure 2:
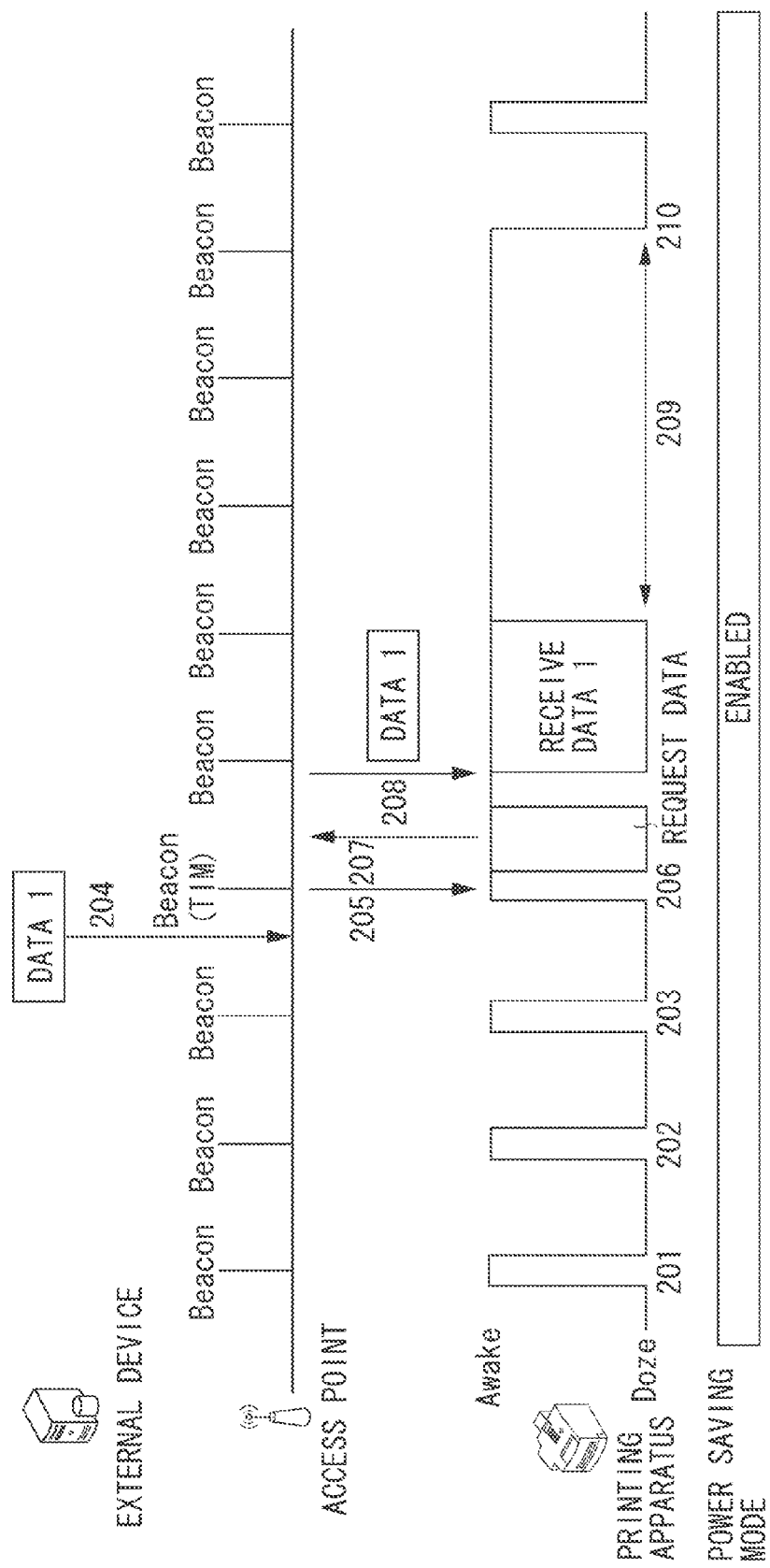
FIG. 2 is a diagram illustrating processing performed when the power saving mode is enabled in the related art.
Figure 3:
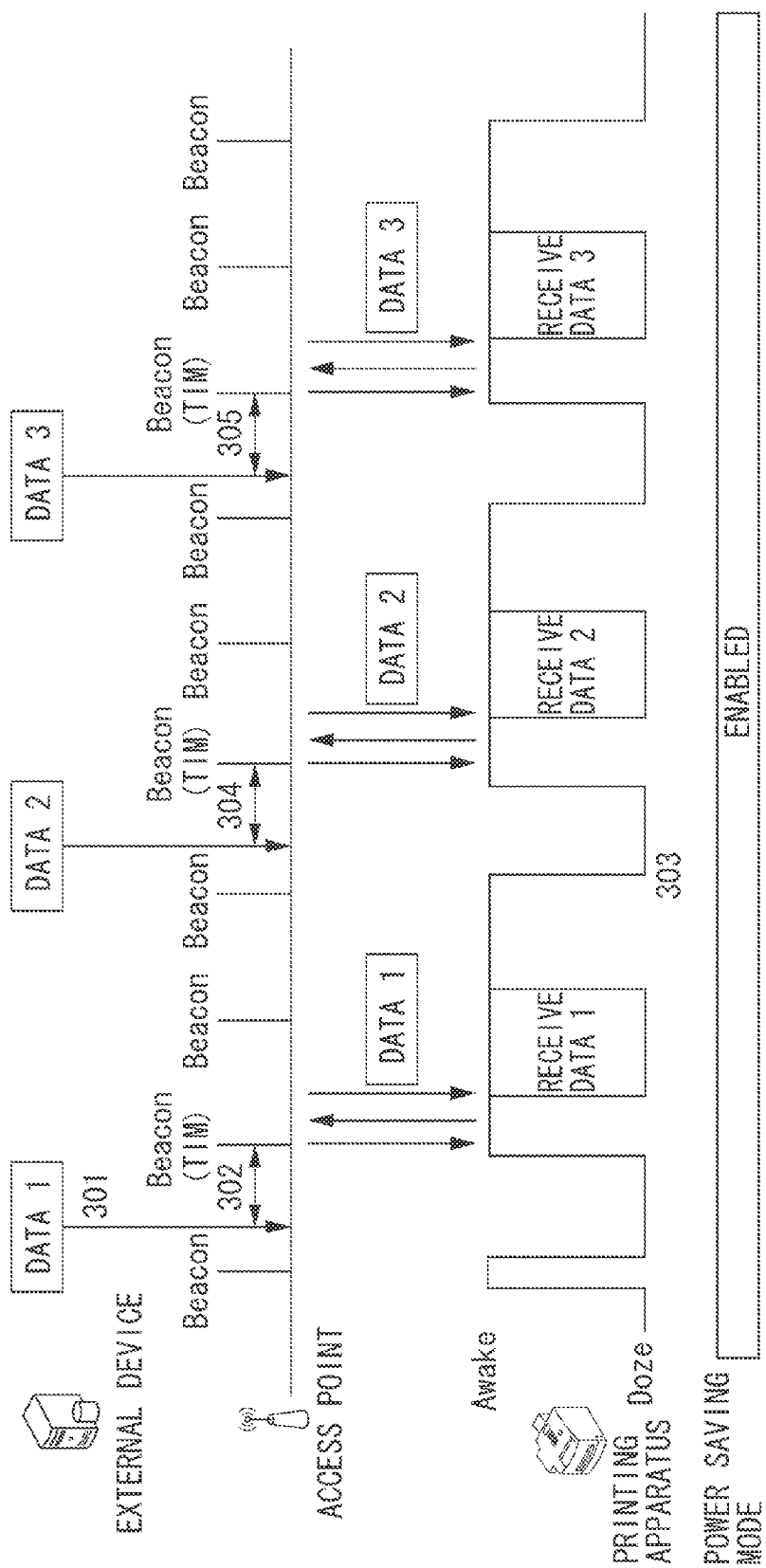
FIG. 3 is a diagram for describing an occurrence of a communication delay.

FIG. 13 illustrates processing performed when the user sets the "power saving mode enabled" and the operation unit 520 displays the menu screen 600 thereon. When a screen displayed on the operation unit 520 is changed from the menu screen 600 to the cloud print screen 800 at timing 1301, in step S1206 in FIG. 12, the power saving mode is disabled based on the change in screen at timing 1302. When the printing apparatus 401 receives print data (which is divided into data 1, data 2, and data 3 in FIG. 13) transmitted from the server 402 via the access point 403, the power saving mode is disabled. Therefore, the communication delays with time 302, time 304, and time 305 described in FIG. 3 can be prevented from occurring.

When a screen displayed on the operation unit 520 is changed from the cloud print screen 800 to the menu screen 600 at timing 1303, in step S1208 in FIG. 12, the power saving mode is enabled based on the change in screen at timing 1304. Thereby, the power saving mode in the printing apparatus 401 can be temporarily changed to be disabled, thereby reducing power consumption in the wireless communication unit 560 of the printing apparatus 401.

The structure for changing the power saving mode between enabled and disabled in response to a screen transition has been described according to the first exemplary embodiment. To the contrary, according to a second exemplary embodiment, even if a screen to be displayed is changed to a screen (such as the menu screen 600) for which the power saving mode is to be enabled, the power saving mode is kept disabled while the printing apparatus 401 is receiving data transmitted from the server 402.

For example, even if a screen to be displayed is changed to the menu screen 600 in response to a user's selection of the button 801, the power saving mode is kept disabled while the printing apparatus 401 is receiving print data from the server 402. The power saving mode is switched to enabled when the printing apparatus 401 completely receives the print data.

If the power saving mode is enabled while the printing apparatus 401 is receiving data transmitted from the server 402, there is a drawback that a communication delay easily occurs. The drawback can be eliminated by the present exemplary embodiment.

When the operation unit 520 of the printing apparatus 401 has a web browsing function, the operation unit 520 can display thereon a screen based on screen information of a HyperText Markup Language (HTML) file or the like acquired from the server 402. Therefore, a method for switching the power saving mode between disabled and enabled based on screen information acquired from the server 402 will be described according to a third exemplary embodiment.

The structure of the communication system according to the present exemplary embodiment is similar as that according to the first exemplary embodiment, and thus will be described with reference to the same drawings as in the first exemplary embodiment. The present exemplary embodiment is different from the first exemplary embodiment in that the operation unit 520 of the printing apparatus 401 has the web browsing function, and the operation unit 520 displays thereon various screens described in FIGS. 6 to 10A and 10B based on the screen information of an HTML file or the like acquired from the server 402.

FIGS. 14A and 14B illustrate exemplary screen information acquired by the printing apparatus 401 from the server 402. Screen information 1400 illustrated in FIG. 14A is directed for displaying the menu screen 600. Screen information illustrated in FIG. 14B is directed for displaying the cloud print screen 800.

According to the present exemplary embodiment, the screen information acquired from the server 402 contains a unique tag <power_save>. The unique tag is used as identification information to be referred to when the printing apparatus 401 disables or enables the power_saving mode. A tag 1401 <power_save mode=ON> indicates that the power saving mode does not need to be disabled when the operation unit 520 displays the screen based on the screen information thereon. On the other hand, a tag 1411 <power_save mode=OFF> indicates that the power saving mode needs to be disabled when the operation unit 520 displays the screen based on the screen information thereon.

Screen information for displaying the copy screen, the setting screen, and the history screen contains the <power_save mode=ON> tag like the screen information 1400. Screen information for displaying the maintenance screen contains the <power_save mode=OFF> tag like the screen information 1410.

In the first exemplary embodiment, in step S1204 in FIG. 12, the CPU 501 determines whether a changed screen is to be used to disable the power saving mode based on a type of the changed screen and the management table 1100 in FIG. 11. To the contrary, in the present exemplary embodiment, the CPU 501 determines whether a changed screen is to be used to disable the power saving mode based on the <power_save> tag. That is, the CPU 501 determines that a changed screen is to be used to disable the power saving mode in step S1204 in <power_save mode=OFF> with reference to the <power_save> tag on acquiring screen information for displaying the changed screen. On the other hand, the CPU 501 determines that a changed screen is not to be used to disable the power saving mode in step S1204 in <power_save mode=ON> with reference to the <power_save> tag.

As described above, according to the present exemplary embodiment, the printing apparatus 401 can switch the power saving mode between disabled and enabled based on the screen information acquired from the server 402. Thereby, a communication delay which easily occurs when the power saving mode is enabled can be prevented as in the first exemplary embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261312 filed Nov. 29, 2012, which is hereby incorporated by reference herein in its entirety.

What is claimed is:

1. An information processing apparatus comprising:
a wireless communication unit which embodies a processor configured to execute wireless communication, the wireless communication unit being operable in a power saving mode in which a state of the wireless communication unit is transitioned to an Awake state and to a Doze state in synchronization with a beacon of an access point;
a setting unit configured to set, based on a user instruction, whether the power saving mode is to be used;
a display unit configured to display a screen; and
a controlling unit configured to, in a case where the setting unit sets that the power saving mode is to be used, perform control to temporarily disable the power saving mode in a condition that the display unit displays a predetermined screen.

2. The information processing apparatus according to claim 1, wherein the information processing apparatus is a printing apparatus which is capable of executing printing processing.

3. The information processing apparatus according to claim 1, wherein the predetermined screen relates to a function of acquiring moving image data from an external apparatus.

4. The information processing apparatus according to claim 3, wherein the moving image data indicates a maintenance procedure of the information processing apparatus.

5. The information processing apparatus according to claim 1, wherein the predetermined screen relates to a function of acquiring print data from an external apparatus.

6. A method comprising:
using a wireless communication unit which embodies a processor to execute wireless communication, the wireless communication unit being operable in a power saving mode in which a state of the wireless communication unit is transitioned to an Awake state and to a Doze state in synchronization with a beacon of an access point;
setting, based on a user instruction, whether the power saving mode is to be used;
displaying a screen on a display unit; and
performing control, in a case where the setting sets that the power saving mode is to be used, to temporarily disable the power saving mode in a condition that the display unit displays a predetermined screen.

7. A non-transitory computer-readable storage medium storing a program capable of causing a computer to perform a method, the method comprising:
using a wireless communication unit which embodies a processor to execute wireless communication, the wireless communication unit being operable in a power saving mode in which a state of the wireless communication unit is transitioned to an Awake state and to a Doze state in synchronization with a beacon of an access point;
setting, based on a user instruction, whether the power saving mode is to be used;
displaying a screen on a display unit; and
performing control, in a case where the setting sets that the power saving mode is to be used, to temporarily disable the power saving mode in a condition that the display unit displays a predetermined screen.

* * * * *